US008082496B1

United States Patent
Leeds et al.

(10) Patent No.: US 8,082,496 B1
(45) Date of Patent: Dec. 20, 2011

(54) PRODUCING A SET OF OPERATIONS FROM AN OUTPUT DESCRIPTION

(75) Inventors: Bennett Michael Leeds, Los Gatos, CA (US); Donald Ray Walling, Jr., Campbell, CA (US); Janice Kendall, San Francisco, CA (US)

(73) Assignee: Adobe Systems Incorporated, San Jose, CA (US)

( * ) Notice: Subject to any disclaimer, the term of this patent is extended or adjusted under 35 U.S.C. 154(b) by 687 days.

(21) Appl. No.: 11/341,797

(22) Filed: Jan. 26, 2006

(51) Int. Cl.
*G06F 17/00* (2006.01)
(52) U.S. Cl. .................................. 715/255; 715/256
(58) Field of Classification Search .......... 715/205–210, 715/255; 706/45–48
See application file for complete search history.

(56) References Cited

U.S. PATENT DOCUMENTS

| | | | | |
|---|---|---|---|---|
| 5,664,110 A * | 9/1997 | Green et al. | ........ | 705/27.2 |
| 5,802,504 A * | 9/1998 | Suda et al. | ........ | 706/11 |
| 5,850,561 A * | 12/1998 | Church et al. | ........ | 715/234 |
| 5,875,429 A * | 2/1999 | Douglas | ........ | 704/275 |
| 5,897,646 A * | 4/1999 | Suda et al. | ........ | 715/222 |
| 6,108,640 A * | 8/2000 | Slotznick | ........ | 705/7.18 |
| 6,996,781 B1 * | 2/2006 | Myers et al. | ........ | 715/763 |
| 7,085,708 B2 * | 8/2006 | Manson | ........ | 704/9 |
| 7,120,869 B2 * | 10/2006 | Birder | ........ | 715/234 |
| 7,171,349 B1 * | 1/2007 | Wakefield et al. | ........ | 704/9 |
| 7,200,816 B2 * | 4/2007 | Falk et al. | ........ | 715/762 |
| 7,257,770 B2 * | 8/2007 | Narahara | ........ | 715/234 |
| 7,363,581 B2 * | 4/2008 | Parks et al. | ........ | 715/235 |
| 7,409,683 B2 * | 8/2008 | Krebs | ........ | 717/162 |
| 7,503,012 B2 * | 3/2009 | Chen et al. | ........ | 715/769 |
| 7,584,413 B2 * | 9/2009 | Takaoka et al. | ........ | 715/209 |
| 7,584,422 B2 * | 9/2009 | Ben-Yehuda et al. | ........ | 715/236 |
| 7,676,489 B2 * | 3/2010 | Kaiser | ........ | 707/999.102 |
| 7,761,843 B2 * | 7/2010 | Ortscheid | ........ | 717/106 |
| 2002/0038322 A1 * | 3/2002 | Iijima | ........ | 707/526 |
| 2002/0059337 A1 * | 5/2002 | Takaoka et al. | ........ | 707/500 |
| 2002/0073119 A1 * | 6/2002 | Richard | ........ | 707/513 |
| 2002/0087602 A1 * | 7/2002 | Masuda et al. | ........ | 707/515 |
| 2003/0041077 A1 * | 2/2003 | Davis et al. | ........ | 707/500 |
| 2003/0083872 A1 * | 5/2003 | Kikinis | ........ | 704/243 |
| 2003/0192009 A1 * | 10/2003 | Arcand et al. | ........ | 715/513 |
| 2004/0143569 A1 * | 7/2004 | Gross et al. | ........ | 707/3 |
| 2004/0181390 A1 * | 9/2004 | Manson | ........ | 704/2 |
| 2004/0205554 A1 * | 10/2004 | Goswami et al. | ........ | 715/513 |
| 2004/0205615 A1 * | 10/2004 | Birder | ........ | 715/523 |
| 2004/0261017 A1 * | 12/2004 | Perry | ........ | 715/513 |
| 2005/0021548 A1 * | 1/2005 | Bohannon et al. | ........ | 707/101 |
| 2005/0039119 A1 * | 2/2005 | Parks et al. | ........ | 715/515 |
| 2005/0132284 A1 * | 6/2005 | Lloyd et al. | ........ | 715/517 |
| 2005/0154690 A1 * | 7/2005 | Nitta et al. | ........ | 706/46 |
| 2005/0154994 A1 * | 7/2005 | Chen et al. | ........ | 715/770 |
| 2005/0240876 A1 * | 10/2005 | Myers et al. | ........ | 715/763 |
| 2005/0273771 A1 * | 12/2005 | Chang et al. | ........ | 717/136 |
| 2005/0278368 A1 * | 12/2005 | Benedikt et al. | ........ | 707/101 |
| 2006/0036612 A1 * | 2/2006 | Harrop et al. | ........ | 707/100 |
| 2006/0206336 A1 * | 9/2006 | Gurram et al. | ........ | 704/275 |
| 2006/0248070 A1 * | 11/2006 | Dejean et al. | ........ | 707/5 |
| 2009/0150363 A1 * | 6/2009 | Gross et al. | ........ | 707/3 |

* cited by examiner

*Primary Examiner* — Doug Hutton, Jr.
*Assistant Examiner* — Benjamin Smith
(74) *Attorney, Agent, or Firm* — Van Pelt, Yi & James LLP

(57) ABSTRACT

Producing a set of operations from an output description is disclosed. Producing includes receiving a description of a desired result, where the description is associated with a metalanguage, determining a set of operations such that executing the set of operations would produce the desired result, and providing the set of operations as input to one or more applications.

26 Claims, 6 Drawing Sheets

US 8,082,496 B1

PRODUCING A SET OF OPERATIONS FROM AN OUTPUT DESCRIPTION

BACKGROUND OF THE INVENTION

Computer systems, such as desktop applications, web-based applications, or batch-oriented server applications, operate by performing a set of operations on a set of input data to produce the desired result(s). People, whether users or system designers, typically determine which operations the computer system(s) will perform, and in which order, on the input data in order to obtain the desired result.

People who use computer systems, such as artists or publishing professionals, may not be aware of how to program them. The user may know what the desired result is, but may not know how to determine the operations and order of operations needed to obtain the desired result. Even if the user does know which operations to use, the user may not know the optimal operations to use, or it may take work on the user's part to determine this. Today's computer systems force users to become cognizant of these aspects if they are to achieve the desired results in an efficient manner. Improved techniques for obtaining a desired result would be useful.

BRIEF SUMMARY OF THE INVENTION

Producing a set of operations from an output description is disclosed. In some embodiments, producing includes receiving a description of a desired result, where the description is associated with a metalanguage, determining a set of operations such that executing the set of operations would produce the desired result, and providing the set of operations as input to one or more applications.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
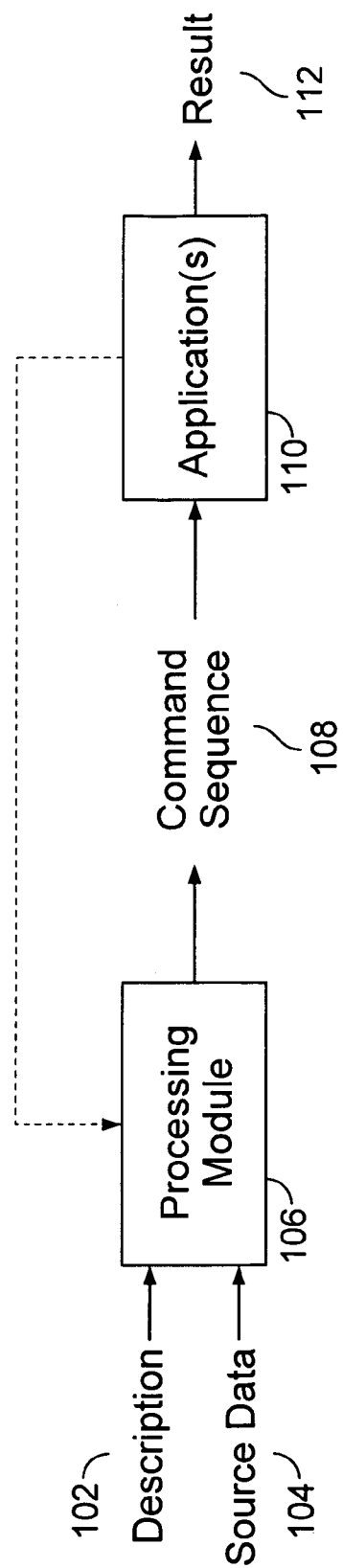
FIG. 1 is a block diagram illustrating an embodiment of a system for determining a set of operations based on a description of a desired result.

FIG. 1 is a block diagram illustrating an embodiment of a system for determining a set of operations based on a description of a desired result. In the example shown, description 102 and source data 104 are provided as input to processing module 106, which may reside on a server. The output of processing module is command sequence 108, which is provided as input to application(s) 110. Result 112 is provided as output by application(s) 110.

Description 102 includes a description of a desired result. Description 102 does not necessarily include any commands and/or intermediate content used to produce the desired result; rather, description 102 specifies content included in the desired result. For example, a desired result is a Portable Document Format (PDF) document assembled from multiple chapters, and description 102 specifies contents of the document. The description, in some embodiments, at least in part specifies layout of the contents included in the desired result. Description 102 may be associated with a metalanguage. Examples of metalanguages include XML, Hypertext Markup Language (HTML), Cascading Style Sheets (CSS), eXtensible Stylesheet Language (XSL), XSL Formatting Objects (XSLFO), and any markup language. In some embodiments, description 102 is specified in a language based on Extensible Markup Language (XML). In some embodiments, description 102 is specified in natural language (and processing module 106 may use natural language processing techniques to process description 102). Description 102 may be generated programmatically or manually. For example, description 102 is generated based on input from a graphical user interface (GUI). In another example, a user may use a template to create description 102. XML generation tools may be used. In various embodiments, description 102 may be specified in a format associated with one or more of the following: XML, HTML, CSS, XSL, XSL, and XSLFO.

Source data 104 may include any data used to generate a desired result. For example, a desired result may include a PDF document that includes multiple chapters. In this case, source data 104 may include the chapters. In another example, a desired result may include an image of a face. In this case, source data 104 may include a source image that includes the face and possibly other objects. Source data 104 may include multiple source data. Description 102 may reference source data 104 in various ways in various embodiments. For example, description 102 may reference source data 104 via an indirection mechanism, such as aliasing.

Processing module 106 processes description 102 to produce a set of operations. Based on description 102, processing module 106 determines a set of operations that when executed produce the desired result. The set of operations may be command sequence 108. For example, description 102 includes the description "document with table of contents and chapters." Command sequence 108 of the example includes operations associated with "determining total number of chapters", "inserting chapters up to the total number of chapters", "calculating page numbers", "inserting table of contents", and "inserting page numbers". An order of operations may be associated with command sequence 108. In some embodiments, description 102 is specified in a description based language (e.g., metalanguage) and command sequence 108 is specified in a programming language (e.g., function based language such as C and C++).

Command sequence 108 is provided as input to application(s) 110. Source data 104 may be passed as input to application(s) 110 and/or may be passed as part of command sequence 108. Operations may be associated with an application. For example, the application may provide an application programming interface (API). Command sequence 108 may include a call to the API in order to cause an application to execute an operation associated with that application. In some embodiments, an output of application(s) 110 is fed back to processing module 106. In this case, there may be intermediate results that are used by processing module 106 to determine command sequence 108. For example, a table of contents may be generated as an intermediate result.

Application(s) 110 may include one or more applications that are used to produce a desired result. Examples of the applications include one or more of the following: a word processing application, a spread sheet application, a presentation application, a visual graphics applications, a multimedia content application, a publishing application, a document editor, a circuit design application, Adobe Acrobat®, Adobe Photoshop®. Result 112 is the desired result as specified by description 102. For example result 112 may be a document with multiple chapters or an image of a face.

In some embodiments, the description is generated based on GUI input(s). For example, a GUI may be provided for a user to specify a desired result for a document assembly. The user may select icons representing source documents and drag and drop them into an icon representing the result. The user could order the source icons to represent the order of documents in the result, and can select one or more of the sources to which to apply elements such as headers or footers, or to be used for a generated table of contents.

Figure 2:
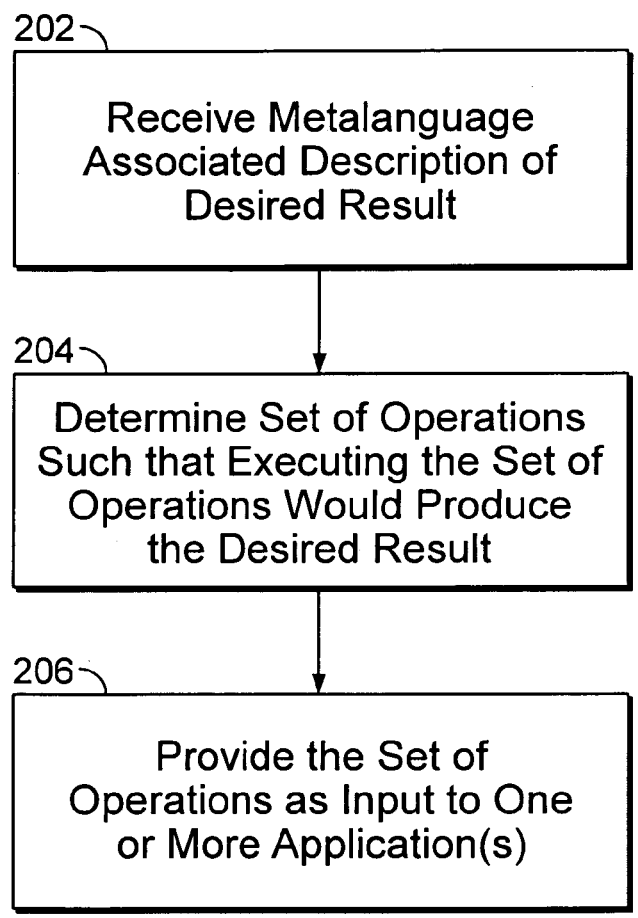
FIG. 2 is a flowchart illustrating an embodiment of a process for determining a set of operations based on a description of a desired result.

FIG. 2 is a flowchart illustrating an embodiment of a process for determining a set of operations based on a description of a desired result. This process may be implemented on processing module 106. In the example shown, the process begins at 202, in which a metalanguage associated description of a desired result is received. For example, description 102 may be received. The description may describe a desired result using source data that may include documents, stylized text, comments, file attachments, etc. The description may describe a desired result that contains data extracted from documents such as comments, text, form data, file attachments, bookmarks, or any other appropriate data. At 204, a set of operations is determined such that executing the set of operations would produce the desired result. For example, a set of operations associated with code or a macro may be generated. Calculations may be performed to determine the set of operations, such as which operations to select and/or an order of operations. For example, the set of operations may include command sequence 108. The set of operations may be associated with an order of operations. The set of operations may include internal and/or external function calls.

At 206, the set of operations is provided as input to one or more applications. For example, command sequence 108 is provided as input to application(s) 110. More than one application may be used. For example, a composite document may include a document and an image as source data. In this case, a document editing application and a photo editing application may be used. In another example, a desired result may include an assembled document that is signed and encrypted. In this case, a document assembler application, a certifying application, and an encryption application may be used. The set of operations may be associated with an order of operations. For example, processing module 106 may determine that encrypting occurs before signing.

A description of a desired result may be written in XML. For example, a Document Description XML (DDX) may be defined. DDX may be used to describe result documents to be built from one or more source documents. In DDX, a PDF document may be broken down into the following building blocks.

The <PDF> element specifies a document which may have come from, or be saved in, a PDF or XML Data Package (XDP) format. Pages in documents being produced may come from pages in source documents. Specific source pages in a <PDF> document can be identified via that element's "pages" attribute. There are two elements which will create pages without a source page to work from: <TableOfContents> and <BlankPage>.

Document Components are parts of a PDF which can be imported and exported but are not necessarily pages or page content. The document component elements in DDX include: <FileAttachments>, <Bookmarks>, <Comments>, <Links> and <Thumbnails>.

Document properties are attributes associated with a document, such as metadata, security settings, and the initial view. The document property elements in DDX include: <Metadata>, <Author>, <Title><<Subject>, <Keywords>, <SecurityProfile>, and <InitialViewProfile>.

Page content is the text and graphics which appear on a page when printed or viewed. Page content elements in DDX include: <Header>, <Footer>, <Watermark>, <Background>, <PageOverlay>, and <PageUnderlay>, which specify new content to be added to pages. In addition, the <Form> element alters existing content on pages.

Page properties are attributes associated with a page which do not necessarily alter the page content, but may alter how the page is viewed or printed and affect the content added to pages through the Page Content elements. The page properties elements in DDX include: <PageLabel>, <PageSize>, <PageMargins>, <CropBox>, <ArtBox>, <BleedBox>, <TrimBox>, <PageOrientation>, and <PageTransform>.

Other elements include <PDFGroup> and <LinkAlias>. The <PDFGroup> element groups together PDF sources. It may be used to enable properties and content to be specified once, yet applied to multiple sources.

In this example, the desired result is a document built from component pieces. The resulting document is to contain a cover letter, a table of contents, two chapters, and an appendix. The <LinkAlias> element provides an alternative name that another document might use to refer to this document (the parent of <LinkAlias>). If the link alias is provided, links may be resolved to an internal link in the result PDF document.

The following is an example (Example 1) of a description of a desired result written in DDX.

Example 1

```
<PDF result="sampledoc.pdf">
<PageMargins left="1 in" top="0.5 in" right="0.5 in" bottom="0.5 in" alternation="OddPages"/>
<PageMargins left="0.5 in" top="0.5 in" right="1 in" bottom="0.5 in" alternation="EvenPages"/>
<Header><Center><StyledText>My Life as a Chef</StyledText> </Center></Header>
<Footer alternation="OddPages"><Right><StyledText><_PageLabel></StyledText> </Right></Footer>
<Footer alternation="EvenPages"><Left><StyledText><_PageLabel></StyledText> </Left></Footer>
<PDF source="coverletter.pdf" includeInTOC="false">
<Header/> <Footer/>
<BlankPage forceEven="true"/>
</PDF>
<TableOfContents styleRef="MyTOC"/>
<PDFGroup>
<PageLabel start="1"/>
<PDF source="chapter1.pdf" baseDocument="true" bookmarkTitle="_SrcTitle">
<LinkAlias>Chapter1</LinkAlias>
<LinkAlias>chapter1.pdf</LinkAlias>
</PDF>
<PDF source="chapter2.pdf" bookmarkTitle="_SrcTitle">
<LinkAlias>Chapter2</LinkAlias>
<LinkAlias>chapter2.pdf</LinkAlias>
</PDF>
</PDFGroup>
<PDF source="appendix.pdf" bookmarkTitle="SrcTitle">
<PageLabel start="1" prefix="A-"/>
<LinkAlias>Appendix</LinkAlias>
<LinkAlias> appendix.pdf</LinkAlias>
<Header><Center><StyledText>Appendix </StyledText></Center></Header>
</PDF>
</PDF>
```

As shown in Example 1, description 102 may describe the desired resulting document in the order in which elements appear in the document. For example, the table of contents, chapter 1, chapter 2, and the appendix, are specified in that order.

The description may be generated in various ways in various embodiments. For example, a financial services company may want to assemble a cover letter, two chapters, and an appendix for each client. The cover letter and the two chapters may change depending on the client, while the appendix may contain standard legal disclosures. A generating application could iterate over the financial services company's database and identify the appropriate sources to populate a document description template. The document description would then be provided to a processing module so that the result document could be generated.

Figure 3:
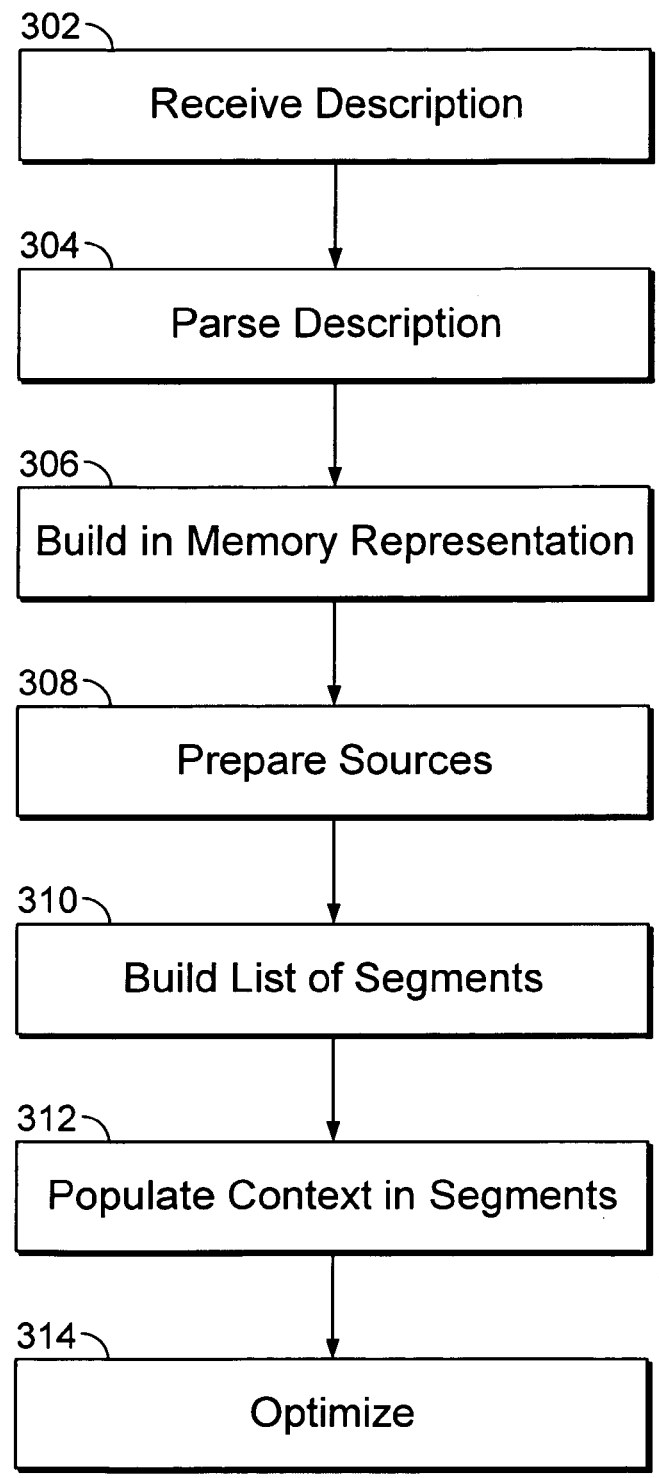
FIG. 3 is a flowchart illustrating an embodiment of a process for determining a set of operations.

FIG. 3 is a flowchart illustrating an embodiment of a process for determining a set of operations. This process may be used to implement 202-206 when Example 1 is the description. In some embodiments, this process is implemented on processing module 106.

In the example shown, the process begins at 302, in which a description is received. In this case, Example 1 is received. At 304, the description is parsed. At 306, an in memory representation is built. For example, an object tree is built, as more fully described below. Although an in memory representation is described, any appropriate representation may be used in various embodiments. For example, for larger result descriptions, the object representation may be built in a permanent store (e.g. on disk) and the object may be processed directly from that storage.

At 308, sources are prepared. For example, a list of operations to be performed on the source data before assembly is generated. At 310, a list of segments is built. A list of segments may be referred to as a blueprint because it provides an outline of the document to be assembled. A segment includes one or more pages of a result document that may share similar properties, such as context. In some embodiments, each segment is associated with a source document, a page range in the result, and a context. When the segment is created, the context is uninitialized in some embodiments.

As used herein, context refers to properties or attributes that may apply to more than one element in a result. For example, in the case of an assembled document, a context may include properties and attributes that may apply to more than one page in the document. If the description is in XML, the properties for a particular page range may be specified explicitly for a <PDF source=" . . . "/> node, or may be inherited from the node's parent(s). For example, a context may apply to blank pages and to Table of Contents pages either explicitly or by inheriting from a parent node. Operations associated with applying context properties to page ranges in a document may be deferred by processing module 106 until after the document is assembled, as more fully described below.

Examples of context properties or attributes include: page size, page margins, art box, bleed box, trim box, page labels, no page labels (remove existing), page orientation, page transformation, headers as styled text or PDF, no headers (remove existing and leave blank), footers as styled text or PDF, no footers (remove existing and leave blank), watermarks, no watermarks (remove existing), background, no background (remove existing), overlay content, underlay content, no XML Forms Architecture (XFA) (remove existing XFA), and no forms (flatten existing forms). For example, art box may define the extent of the page's meaningful content as intended by the creator of the page. Bleed box may define the bounds to which the contents of the page should be clipped when output in a production environment. Trim box may define the intended dimensions of the finished page after printing and trimming. The above attributes are examples of various attributes that may be defined for a document result. In various embodiments, other context properties or attributes may be defined that may be useful for other types of desired results.

At 312, the context in the segments is populated. In some embodiments, the context is filled in based on a recursive algorithm that walks from the top to the bottom of the object tree. In some embodiments, properties propagate downward unless they are overridden. For example, the top level header "My Life as a Chef" (<Header><Center> <StyledText>My Life as a Chef</StyledText> </Center></Header>) applies to all headers unless overridden by a lower level header. In the appendix, the top level header is overridden by the lower (appendix) level header "Appendix" (<Header><Center><StyledText>Appendix </StyledText></Center></Header>).

In some embodiments, a set of operations may correspond to the blueprint obtained at 312. For example, the set of operations may include the appropriate commands to assemble the result document according to the blueprint, such as obtaining each of the input sources ("coverletter.pdf", "chapter1.pdf", etc.) and assembling them into a document using a document assembly application, as more fully described below.

At 314, operations to be performed may be optimized. For example, there may be a certain sequence of operations that optimizes performance. For example, optimization may include one or more of: a combination of operations, a removal of unnecessary operations, an addition of operations, and a rearrangement of operations. 314 is optional. For example, process 310 may already result in a blueprint that specifies an optimal set of operations.

Figure 4:
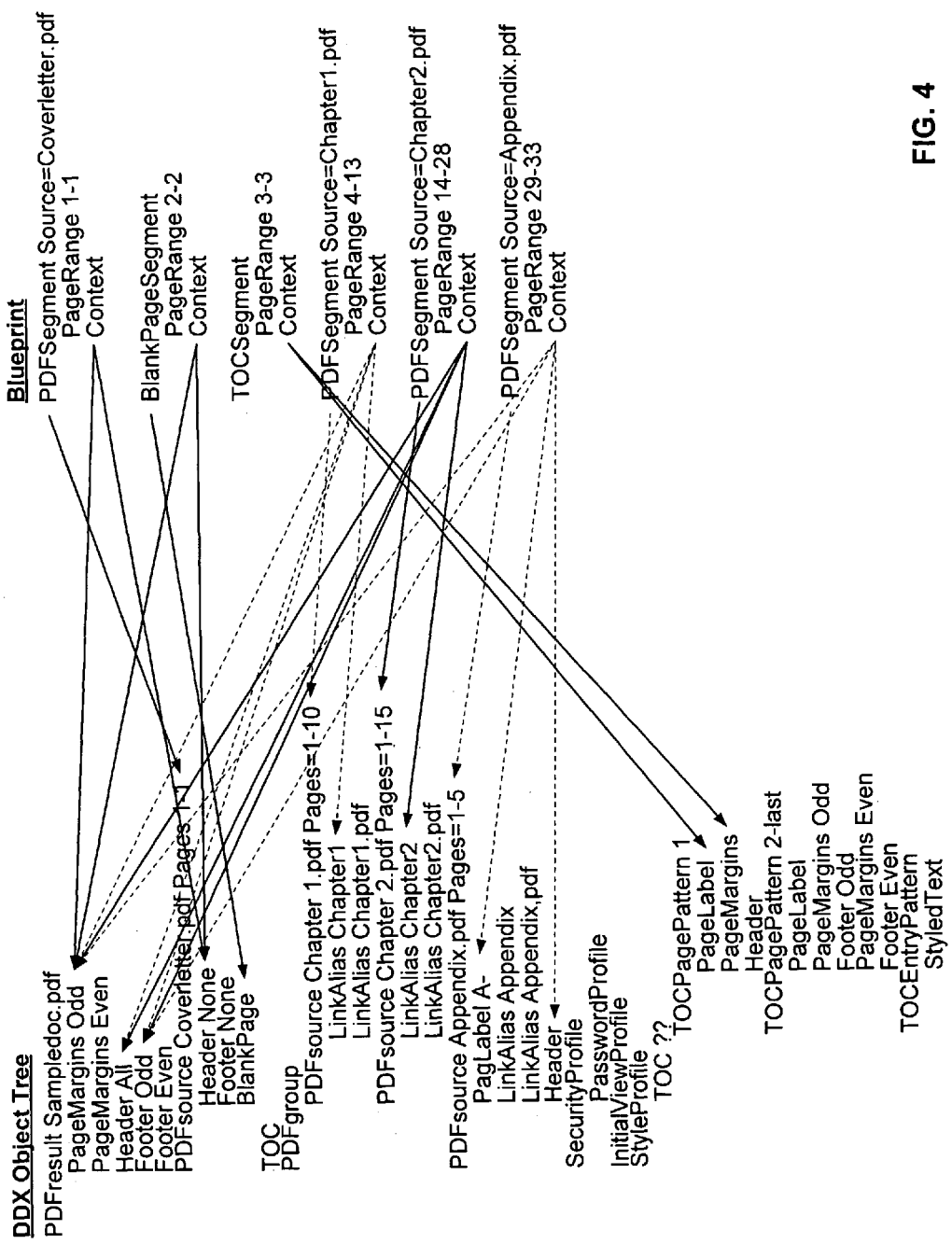
FIG. 4 is a diagram illustrating an example of an object tree and a blueprint.

FIG. 4 is a diagram illustrating an example of an object tree and a blueprint for Example 1. Arrows connect contexts in the blueprint with corresponding objects in the object tree. The object tree may be built at 306. The blueprint may be built at 310. The context references (i.e., arrows) may be generated at 312. The references may be stored as pointers or in any other appropriate way. For example, Example 1 is parsed directly into the object tree at 306. In the object tree, the top object "PDFresult sampledoc.pdf" corresponds to line 1 of Example 1 (<PDF result="sampledoc.pdf">). Below the top object, the object "PageMargins odd" corresponds to line 2 of Example 1 (<PageMargins left="1 in" top="0.5 in" right="0.5 in" bottom="0.5 in" alternation="OddPages"/>"), and so forth.

In this blueprint, each segment is associated with a source document, a page range in the result, and a context. The context references point to the page(s) to which the context applies. Although in this example, each segment is associated with the same elements, each segment is not necessarily associated with the same elements in some embodiments.

Figure 5:
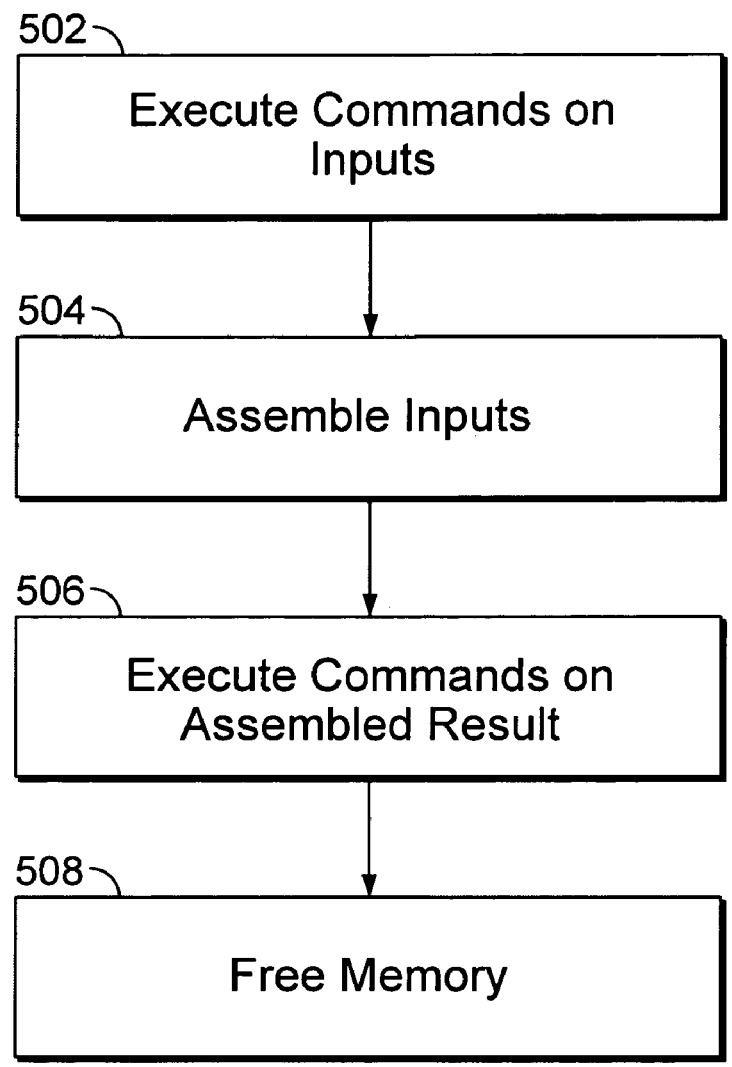
FIG. 5 is a flowchart illustrating an embodiment of a process for executing a set of operations.

FIG. 5 is a flowchart illustrating an embodiment of a process for executing a set of operations. This process may be used to execute the operations determined at 206 when Example 1 is the description. In some embodiments, the operations are based on the blueprint obtained at 312. In some embodiments, this process is implemented on processing module 106 and/or application(s) 110.

At 502, commands are executed on inputs. For example, a command may be executed to obtain "coverletter.pdf", "chapter1.pdf", "chapter2.pdf", and "appendix.pdf". For example, command may be executed to modify an input, if applicable. At 504, inputs are assembled. Sources and modified sources may be assembled by an assembly application based on a blueprint. In some embodiments, the inputs are assembled by walking down the blueprint and assembling the source associated with each segment. For example, based on the blueprint of FIG. 4, "coverletter.pdf" is placed on page 1 of the result document, followed by a blank page, a table of contents, and so forth. At 506, commands are executed on the assembled result. This may include performing post assembly processing, such as executing the context on the appropriate pages. For example, all the headers and footers may be applied at this point. At 508, memory is freed. For example, the object tree may be freed from memory. Any of 502, 504, and/or 506 may be performed by one or more applications.

As shown, the description may be a linear description of the desired document, in which component pieces are described in the order in which they appear in the result document. Attributes of the pieces may be scoped by an XML containment hierarchy. By contrast, the blueprint specifies operations that do not necessarily follow the sequence order or the nesting order of the description. The operations used to produce the result are invoked on components not necessarily in the order of appearance in the document, but in a sequence that enables proper application of shared properties (like page headers) on sub-assemblies. For example, the user may specify the headers and footers for a document near the beginning of a description, whereas the headers and footers may actually be filled in near the end of a command sequence (e.g., when all the page numbers are known), such as at 506. A user does not need to be concerned with selection, sequencing and optimization of operations. Any selection, sequencing and optimizations may be handled by the processing module.

In example of FIG. 5, a set of operations were determined based at least in part on a blueprint. In various embodiments, other sets of operations may be determined and executed when Example 1 is provided as input.

Figure 6:
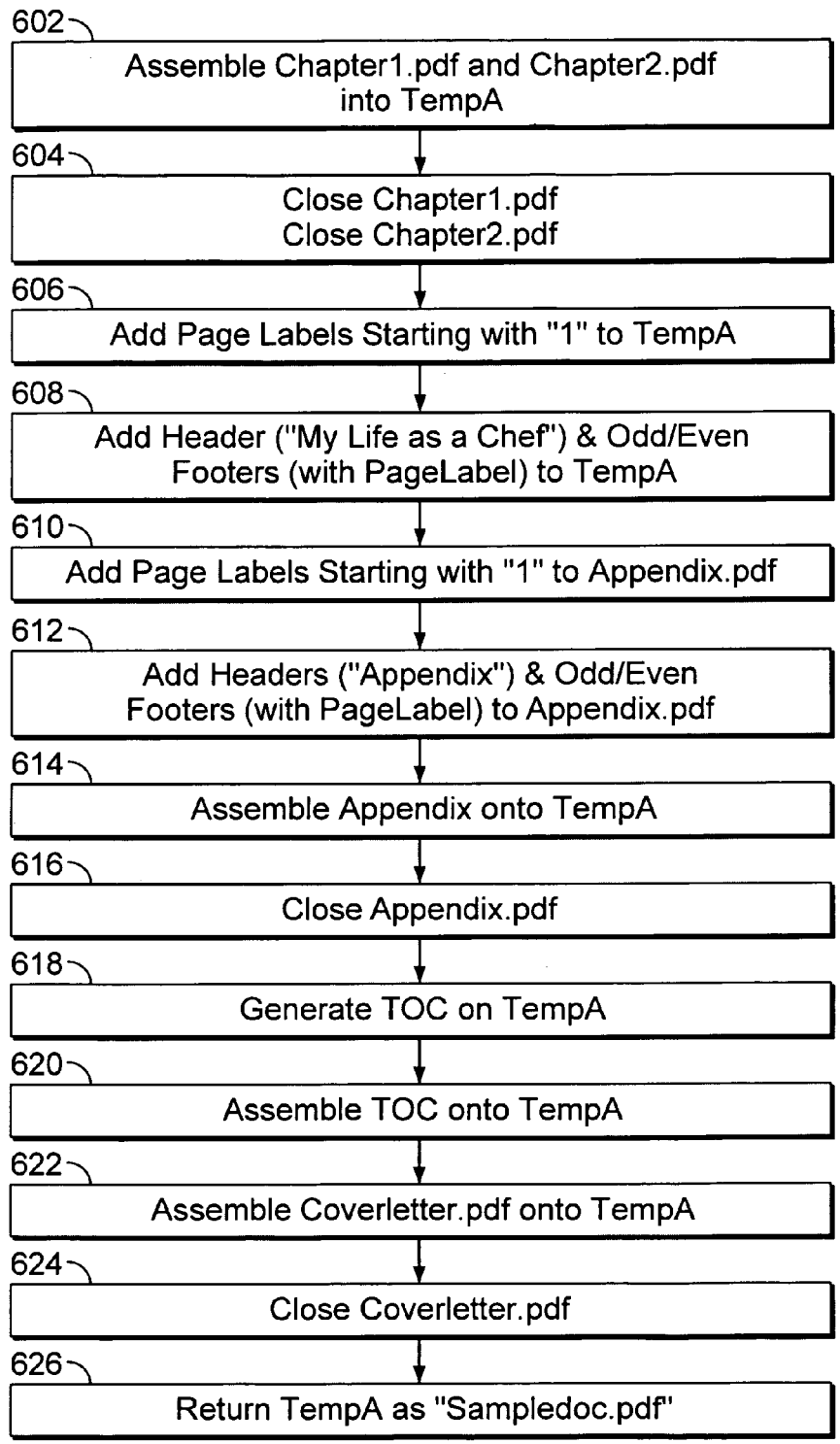
FIG. 6 is a flowchart illustrating an embodiment of a process for executing a set of operations.

FIG. 6 is a flowchart illustrating an embodiment of a process for executing a set of operations. This process may be used to execute the operations determined at 206 when Example 1 is the description. In some embodiments, this process is implemented on processing module 106 and/or application(s) 110.

At 602, "chapter1.pdf" and "chapter2.pdf" are assembled into "TempA", a temporary file. At 604, "chapter1.pdf" and "chapter2.pdf" are closed. At 606, Page Labels starting with "1" are added to "TempA". At 608, Header ("My Life as a Chef") and Odd/Even Footers (with PageLabel) are added to "TempA". At 610, Page Labels starting with "1" are added to "appendix.pdf". At 612, Headers ("Appendix") and Odd/Even Footers (with PageLabel) are added to "appendix.pdf". At 614, the appendix is assembled onto "TempA". At 616, "appendix.pdf" is closed. At 618, the table of contents (TOC) is generated on "TempA". At 620, the table of contents is assembled onto "TempA". At 622, "coverletter.pdf" is assembled onto "TempA". At 624, "coverletter.pdf" is closed. At 626, "TempA" is returned as "sampledoc.pdf".

In some embodiments, the operations associated with FIG. 6 may be optimized. For example, there may be a certain sequence of operations that optimizes performance. Optimization may include one or more of: a combination of operations, a removal of unnecessary operations, an addition of operations, and a rearrangement of operations.

In Example 1, result 112 is a document. However, in various embodiments, result 112 and/or source data 104 may include one or more of: documents, images, CAD data, architecture data, circuit design data, or any other appropriate data.

In the case of an image file, the source data may include multiple source images. The description may include "composite image of standard-sized faces from multiple sources." Given the description, a processing module may determine a command sequence. The command sequence may include a for loop that finds faces in each source image using operations provided by a face detector application. The next operations in the command sequence might include image editing operations to scale the face and place the faces in a single image file. These operations may be provided by an image editing application. Other operations that may be provided include rotating, adjusting lighting, sharpness, red eye, etc.

In another example, a pilot desires travel planning information for a trip. The desired travel planning information may be specified as a desired result in a description and may include a weather report, a flight plan, hotel, security, customs, and agriculture information. The source data may include the dates of travel and the route (e.g., the airports visited). A processing module may process the description and source data and produce a set of commands that retrieve information from various applications and/or databases, and assembles them into the desired result. The commands are provided as input to one or more applications that execute the commands to produce the desired result. The desired result may include an optimized flight plan (for example, to reduce fuel consumption, the number of agricultural inspections, etc.) and a weather report, hotel, security, customs, and agriculture information for that flight plan.

The description may be generated based on GUI input(s). For example, a GUI may be provided for the user to select the desired travel planning information and/or source data information. The GUI may provide a list of travel planning information options, such as weather report, flight plan, hotel, restaurant, attractions, security, customs, and agriculture information. The user may select from these items or enter an item not on the list. The GUI may provide a place to enter dates of travel and the airports visited.

In the case of architecture data, the description may describe the desired characteristics of a building, such as the number of offices with windows, the number of bathrooms, the size of each room, etc. Given the description, a processing module may determine one or more of the following: a blueprint for the building, a list of construction materials/vendors/contractors, and at least a portion of steps/logistics required for the construction of the building, and any other appropriate information.

In a circuit design example, at least one of the applications includes a circuit design program. The description may specify the desired outputs given specified inputs. Given the description, a processing module may determine a functional circuit that has the described input and output characteristics. Other characteristics may also be specified in the description, such as temperature, tolerances, and other electrical and/or physical characteristics.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, including:
    receiving a description of a desired result for a document to be assembled including content from a source document, wherein the description is associated with a metalanguage or a natural language, wherein the description specifies the content from the source document to be included the document to be assembled, and wherein the description at least in part specifies a layout of the content of the desired result;
    determining an optimized set of operations using a processor such that executing the optimized set of operations would produce the desired result, wherein the optimized set of operations is determined to provide an optimized sequence of operations, including:
        building a representation of the description of the desired result, wherein the representation provides a blueprint of the desired result;
        building the blueprint for assembling the document to be assembled, wherein the blueprint specifies operations that enable application of shared properties on subassemblies, and wherein each segment is associated with one of the plurality of source documents and a context; and
        associating each object in the representation with a segment of the desired result; and
    providing the optimized set of operations as input to a plurality of applications to generate an assembled document including content from the source document;
    wherein a plurality of applications are used to execute the set of operations, wherein the set of operations includes a first operation and a second operation, wherein a first operation that is associated with the first application is input to the first application for executing the first operation, and wherein the second operation that is associated with a second application is input to the second application for executing the second operation; and
    wherein the desired result includes a composite document based on the description and the content from a plurality of source documents, wherein the content from a plurality of source documents includes content based on user selected source icons representing the plurality of source documents, and wherein a user selected order of the user selected source icons is used to determine an order of the source documents represented in the desired result.

2. A method as recited in claim 1, wherein the plurality of applications are capable of generating the desired result.

3. A method as recited in claim 1, wherein the representation includes an in memory representation.

4. A method as recited in claim 1, wherein the representation includes an object tree.

5. A method as recited in claim 1, wherein the description specifies the content from a plurality of source documents included in the desired result, and wherein the desired result is a document that includes multiple chapters.

6. A method as recited in claim 1, further including receiving source data.

7. A method as recited in claim 1, wherein an order of operations is associated with the optimized set of operations.

8. A method as recited in claim 1, wherein the description is specified in a format associated with Extensible Markup Language (XML).

9. A method as recited in claim 1, wherein the plurality of applications include an application capable of assembling a document.

10. A method as recited in claim 1, wherein the plurality of applications include a document editing application.

11. A method as recited in claim 1, wherein the plurality of applications include an encryption application.

12. A method as recited in claim 1, wherein the plurality of applications include an image editing application.

13. A method as recited in claim 1, wherein the desired result includes an image.

14. A method as recited in claim 1, wherein determining an optimized set of operations further includes modifying a sequence of operations and removing one or more unnecessary operations to optimize execution performance.

15. A method as recited in claim 1, wherein the desired result includes the assembled document and the description specifies contents of the document in the order in which the contents should appear in the document.

16. A method as recited in claim 1, wherein the description is automatically generated.

17. A computer program product, the computer program product being embodied in a computer readable storage medium and comprising computer instructions for:
    receiving a description of a desired result for a document to be assembled including content from a source documents, wherein the description is associated with a metalanguage or a natural language, wherein the description specifies the content from the source document to be included the document to be assembled, and wherein the description at least in part specifies a layout of the content of the desired result;
    determining an optimized set of operations such that executing the optimized set of operations would produce the desired result, wherein the optimized set of operations is determined to provide an optimized sequence of operations, including:

building a representation of the description of the desired result, wherein the representation provides a blueprint of the desired result building the blueprint for assembling the document to be assembled, wherein the blueprint specifies operations that enable application of shared properties on subassemblies, and wherein each segment is associated with one of the plurality of source documents and a context; and associating each object in the representation with a segment of the desired result; and providing the optimized set of operations as input to a plurality of applications to generate an assembled document including content from the source document wherein a plurality of applications are used to execute the set of operations, wherein the set of operations includes a first operation and a second operation, wherein a first operation that is associated with the first application is input to the first application for executing the first operation, and wherein the second operation that is associated with a second application is input to the second application for executing the second operation; and wherein the desired result includes a composite document based on the description and the content from a plurality of source documents, wherein the content from a plurality of source documents includes content based on user selected source icons representing the plurality of source documents, and wherein a user selected order of the user selected source icons is used to determine an order of the source documents represented in the desired result.

18. A computer program product as recited in claim 17, wherein the plurality of applications are capable of generating the desired result.

19. A computer program product as recited in claim 17, wherein the plurality of applications include an application capable of assembling a document.

20. A system, including:

a processor; and a memory coupled with the processor, wherein the memory is configured to provide the processor with instructions which when executed cause the processor to:

receive a description of a desired result for a document to be assembled including content from a source documents, wherein the description is associated with a metalanguage or a natural language, wherein the description specifies the content from the source document to be included the document to be assembled, and wherein the description at least in part specifies a layout of the content of the desired result, determine an optimized set of operations such that executing the optimized set of operations would produce the desired result, wherein the optimized set of operations is determined to provide an optimized sequence of operations, including by:

building a representation of the description of the desired result, wherein the representation provides a blueprint of the desired result building the blueprint for assembling the document to be assembled, wherein the blueprint specifies operations that enable application of shared properties on subassemblies, and wherein each segment is associated with one of the plurality of source documents and a context; and associating each object in the representation with a segment of the desired result; and provide the optimized set of operations as input to a plurality of applications to generate an assembled document including content from the source document wherein the plurality of applications are used to execute the set of operations, wherein the set of operations includes a first operation and a second operation, wherein a first operation that is associated with the first application is input to the first application for executing the first operation, and wherein the second operation that is associated with a second application is input to the second application for executing the second operation; and wherein the desired result includes a composite document based on the description and the content from a plurality of source documents, wherein the content from a plurality of source documents includes content based on user selected source icons representing the plurality of source documents, and wherein a user selected order of the user selected source icons is used to determine an order of the source documents represented in the desired result.

21. A system as recited in claim 20, wherein the plurality of applications are capable of generating the desired result.

22. A system as recited in claim 20, wherein the plurality of applications include an application capable of assembling a document.

23. A system as recited in claim 20, wherein the plurality of applications include a document editing application and an image editing application.

24. A system as recited in claim 20, wherein the desired result includes the assembled document and the description specifies contents of the document in the order in which the contents should appear in the document.

25. A computer program product as recited in claim 17, wherein the plurality of applications include a document editing application and an image editing application.

26. A computer program product as recited in claim 17, wherein the desired result includes the assembled document and the description specifies contents of the document in the order in which the contents should appear in the document.

* * * * *